United States Patent [19]
F'Geppert

[11] 3,861,231
[45] Jan. 21, 1975

[54] GEAR TEETH REINFORCEMENT
[75] Inventor: Erwin F'Geppert, Novi, Mich.
[73] Assignee: The United States of America as represented by the Secretary of the Army, Washington, D.C.
[22] Filed: Nov. 27, 1973
[21] Appl. No.: 419,323

[52] U.S. Cl.......................... 74/410, 74/417, 74/432
[51] Int. Cl. ..... F16h 57/00, F16h 1/20, F16h 55/00
[58] Field of Search ..... 74/432, 439, 410 X, 417 X, 74/434 X, 443

[56] References Cited
UNITED STATES PATENTS
3,548,673    12/1970    Suchocki .......................... 74/417 X Primary Examiner—Leonard H. Gerin
Attorney, Agent, or Firm—E. Kelly; H. Berl; J. McRae

[57] ABSTRACT

A machined gear having a separately formed reinforcing ring or band associated with the gear teeth to absorb circumferential load forces and to thereby prevent tooth breakage. The ring has a rigid connection with each tooth so that load forces are transmitted from each loaded tooth to the ring; the ring absorbs part of the load and transmits the remainder of the load to the other non-loaded teeth. The invention increases the load capabilities of the gear teeth.

10 Claims, 10 Drawing Figures

PATENTED JAN 21 1975

GEAR TEETH REINFORCEMENT

The invention described herein may be manufactured, used, and licensed by or for the Government for governmental purposes without payment to me of any royalty thereon.

BACKGROUND OF THE INVENTION

In ELEMENTS OF MACHINE DESIGN by Dexter S. Kimball and John Barr, published in 1923, there is disclosed on page 328 thereof a shroud for a cast spur gear; the shroud consists of an annular ring of metal integral with one or both of the gear sides. The shroud is stated to strengthen the gear teeth against shear forces.

THE PRESENT INVENTION

The present invention is directed to arrangements for strengthening the teeth of machined gears. The preferred strengthening means consists of an endless ring or band formed separately from the gear but rigidly connected to each gear tooth so that tangential load forces are transmitted from the loaded tooth to the ring and thence to the other teeth. A particular object of the invention is to provide a low cost method of attaching the ring to a machined gear.

THE DRAWINGS

FIG. 1 fragmentarily illustrates two spur gears meshing together.

THE DRAWINGS IN DETAIL

Figure 1:
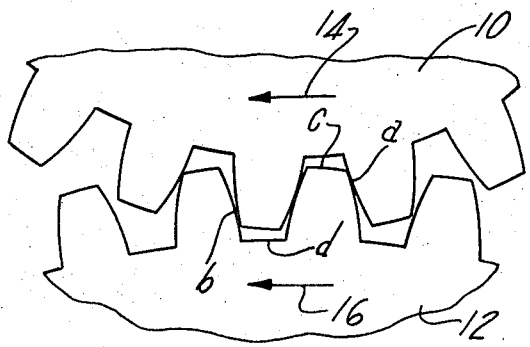

FIG. 1 fragmentarily illustrates two meshed spur gears 10 and 12 arranged to move in the directions of arrows 14 and 16. Gear 10 is the driving gear, and gear 12 is the driven gear.

The tooth of drive gear 10 first makes contact with the tooth of driven gear 12 at approximately the point designated by reference letter $a$. The surfaces of the meshed teeth slide on one another until the separation point, designated by letter $b$, is reached. The contacting surfaces of the teeth slide or roll on one another within the radial limits defined by letters $a$ and $b$. The driving tooth begins to engage the driven tooth at a point $a$ near its root surface; the driving tooth separates from the driven tooth at a point $b$ near its outer tip. The driven tooth initiates contact with the driver near its outer tip $c$, and ends its contact with the driver near the root surface $d$. Letters $a$ and $b$ establish the zones of pressure contact between the meshed teeth.

It will be seen from FIG. 1 that the instantaneous contact area is rather small. Only one or two pairs of teeth are engaged at any one moment. Additionally, the contact areas are essentially line contact rather than extended surface area contact. The relatively small total contact area makes for relatively large unit pressure loadings.

While a tooth is contacted near its outer tip the load forces present an increased shearing stress on the tooth; this is because the load force is applied relatively far from the tooth support area defined by the root surface, and because the tooth is relatively thin at its outer tip area. It appears therefore that if the gear teeth are to be strengthened or reinforced the support mechanism should most advantageously act along tangential lines near the outer tip areas of the teeth.

Figures 2, 5, 6:
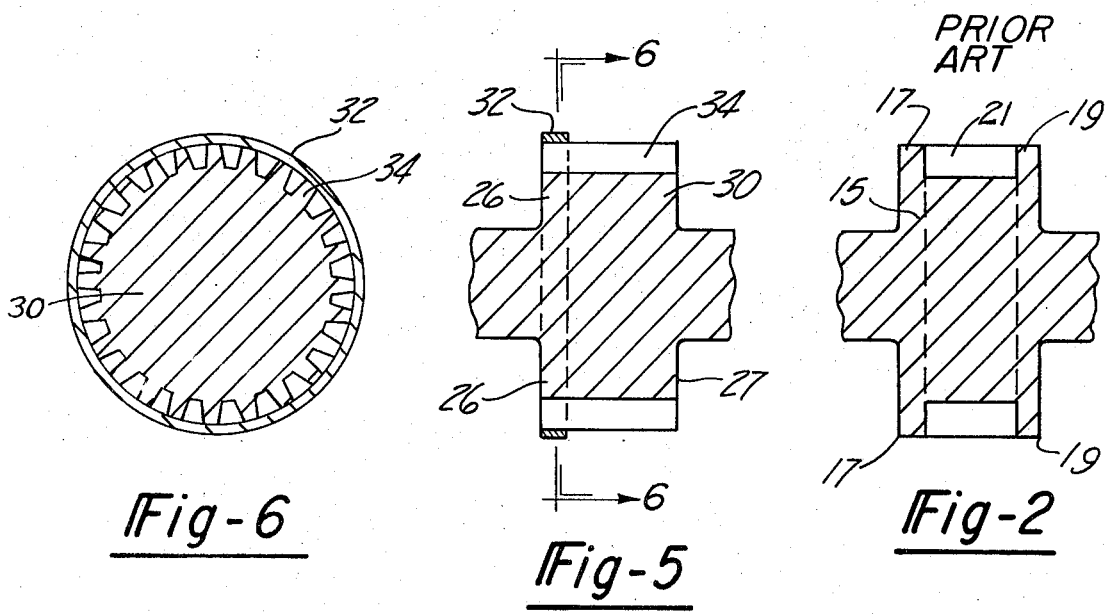
FIG. 2 is a sectional view taken through a prior art gear having a gear tooth reinforcing structure cast integrally therewith.
FIG. 5 is a sectional view through another spur gear incorporating the present invention.
FIG. 6 is a view taken on line 6—6 in FIG. 5.

FIG. 2 illustrates a spur gear 15 formed as a casting and having integral shroud walls 17 and 19 at opposite ends or edges of the gear teeth 21. Walls 17 and 19 are endless walls that extend entirely around the gear body periphery to join or interconnect the ends of the teeth. Tangential loads applied to individual ones of the teeth are transmitted to the shroud walls 17 and 19. These walls absorb all or a portion of the load, depending on the magnitude of the load, thickness of the walls, wall materials, etc. In most cases the shroud walls would probably transmit part of the load to the adjacent teeth.

The FIG. 2 arrangement presumably offers strength advantages when compared with cast gears of the conventional unshrouded type. Cast gears however have certain inherent disadvantages; for example, relatively rough surface characteristics contributing to high wear rates and noisy operation, limited choice of materials needed for attainment of desired combinations of characteristics (hardness, toughness, elasticity, etc), and inability to hold close tolerances on the teeth surfaces (contour, spacing, etc).

Figures 3, 4:
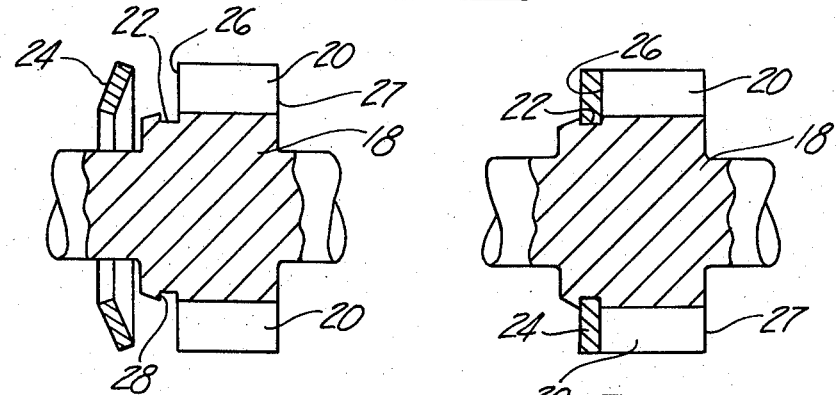
FIG. 3 is a sectional view taken through a spur gear having the present invention incorporated therein.
FIG. 4 is a sectional view taken through the FIG. 3 gear while in a partially assembled condition.

FIGS. 3 and 4 illustrate one embodiment of the present invention which consists of a spur gear body 18 having teeth 20 formed by machining grooves in the body edge surface. Teeth 20 extend between side faces 26 and 27 of the gear body. The gear body is also formed with a circumferential groove 22 adapted to receive the inner edge area of a plate or ring 24. Plate 24 is formed as a frustro-conical plate so that when it is forced axially onto the gear body the outer peripheral face areas of the plate achieve pressure contact with side face 26 of the gear body. The groove-forming rim or shoulder surface 28 retains plate 24 in pressure contact with gear side face 26.

The gear reinforcing plate 24 preferably has sufficient contact with the gear teeth as to minimize tooth deflection under tangential load forces. If the pressure contact obtained by deformation of plate 24 is insufficient then the plate may be welded or brazed to the gear body at the tooth contact points. During service plate 24 absorbs at least part of the tangential loads imposed on each tooth while it is meshed with the tooth on the mating gear. Plate 24 is preferably formed of a material having a high shear strength such as high carbon steel. The gear body may be formed of a material selected for surface hardness and machinability, such as phosphor bronze.

FIGS. 5 and 6 illustrate another embodiment of the invention comprising a spur gear body 30 having an endless reinforcing band 32 rigidly connected with its gear teeth 34. Teeth 34 are machined in the edge of the gear body to extend between side faces 26 and 27. Band 32 may be welded or brazed to the gear body at the points where it contacts the gear teeth. Electron beam welding, using a high energy laser beam, may be a particularly advantageous method of connecting materials that are best suited for wear and strength, but are otherwise not suited for achievement of high strength welded joints. Electron beam welding is also advantageous because it has practically no distortional effect on adjacent surfaces; i.e., the gear teeth retain their original surface contour up to the point of joinder with the reinforcing ring.

The reinforcing band may be connected to the gear body by shrink fit procedures; i.e., the band may be slipped onto the gear body in a relatively heated condition so that after the band has cooled it tightly grips the gear teeth. The shrink fit places the band in tension so that the band exerts inwardly radiating compressive forces on the edges of the gear teeth. Also, the band may form chord-like sections from one tooth to another, thereby in effect allowing the teeth to dig into the band surface in an interlocking fashion.

Figure 7:
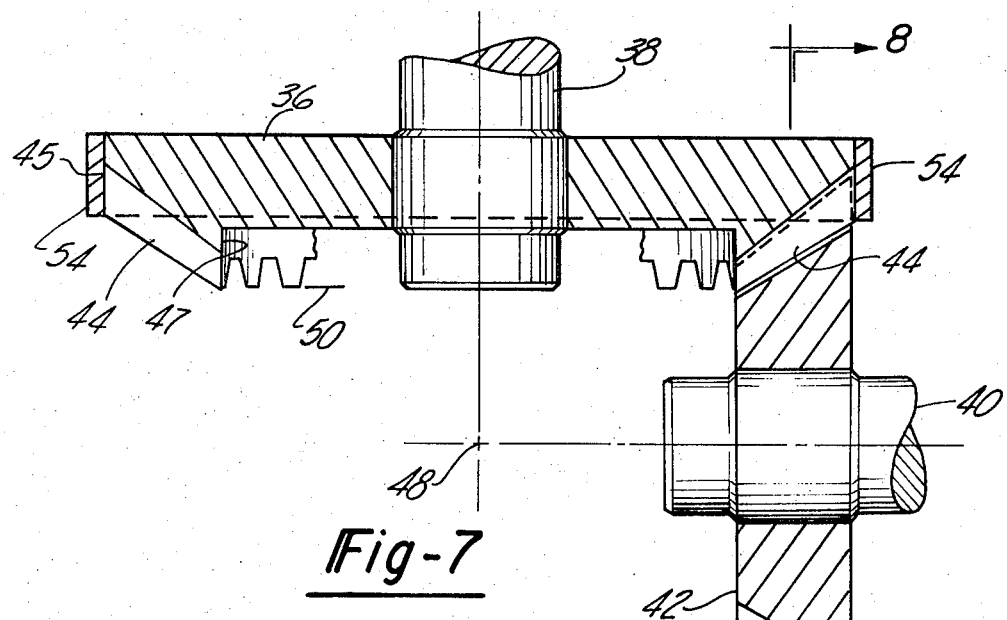
FIG. 7 is a sectional view taken through two meshed bevel gears, one of which incorporates the present invention.
Figure 8:
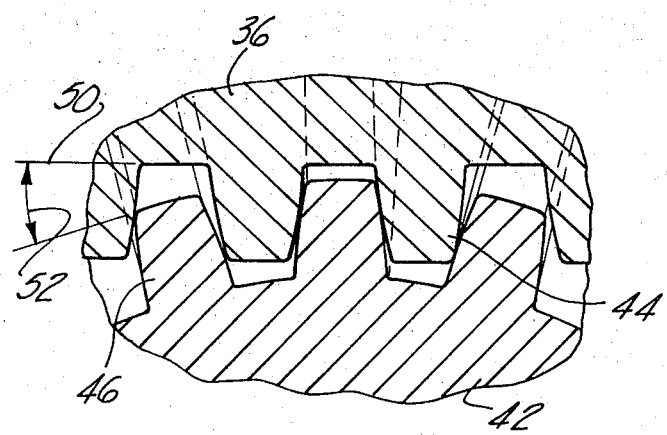
FIG. 8 is a sectional view taken on lines 8—8 in FIG. 7.

FIGS. 7 and 8 illustrate the invention applied to a bevel gear. As shown, bevel gear body 36 is mounted on a shaft 38 that is angularly oriented to a second shaft 40 which carries a pinion gear 42. The teeth 44 of the bevel gear 36 are machined to extend between outer circumferential face 45 of the gear body and inner circumferential face 47 of the gear body. The meshing teeth 44 and 46 of the two gears have their mating surfaces centered at the shaft centerline intersection point 48.

The shaft centerline intersection point 48 is somewhat more difficult to control with precision as compared to the gear centerline spacing of the spur gears. Therefore bevel gears usually have somewhat greater tolerances on the clearance distances than spur gears. Gear operation is influenced by axial adjustment of the gear on the shaft; i.e., the gear must be located at a precise point along the length of the shaft for proper mesh with the mating gear. This factor tends to increase tolerances on the clearance distances of bevel gears. Tolerances on the clearance distances must also be somewhat increased because the teeth approach one another at relatively small approach angles. For example, teeth 44 in the FIG. 7 gear move in a horizontal plane 50 that maintains a relatively small angle 52 to the plane of the tips of teeth 46 of the mating gear. The approach angle is somewhat less than the approach angle in the case of spur gears. Spur gears advance toward one another from opposite sides of the tangential plane running through the meshed teeth; they thus have relatively large approach angles.

The tolerance conditions attained with bevel gears are such that the contacting surfaces have relatively non-uniform pressure engagement during the gear meshing period. Such non-uniform pressure can produce high localized stresses that have an increased tendency to produce tooth breakage. To minimize this condition it is a practice to cut the gears to achieve an adjustable contact pattern. At light loads the teeth are intended to be engaged nearer the inner radius of the gear wheel (i.e., at the toes of the gear teeth near face 47), while at heavier loads the teeth are intended to be engaged nearer the outer radius of the gear wheel (i.e., at the heel areas of the gear teeth near face 45). The highest loads are intended to be borne by the thicker sections of the teeth toward the outer periphery of the gear wheel. The tooth surfaces are contoured so that progressive deflection of the tooth by the load increases the contact area from the toe area to the heel area.

Figure 10:
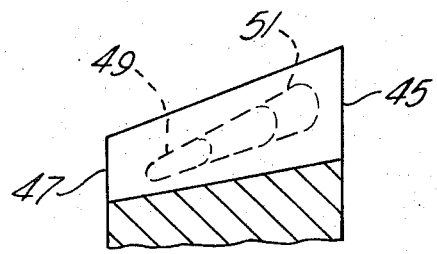
FIG. 10 illustrates a gear loading pattern.

FIG. 10 illustrates the intended contact pattern. Light loadings are borne by the small elliptical area 49, and heavier loadings are carried by the larger elliptical area 51. The teeth surfaces may be slightly crowned to confine the pressure contact areas to the face areas remote from teeth edges 45 and 47.

Gear 36 in FIG. 7 is provided with a tooth-reinforcement means in the form of an endless ring or band 54 encircling the gear wheel at the heel areas of the gear teeth 44. Band 54 may be adhered to the gear body by shrink fit procedures, and/or by welding or brazing techniques. The band engages the tooth areas that are designed to be effective during the high load periods. The band thus is able to perform its function when most needed.

Figure 9:
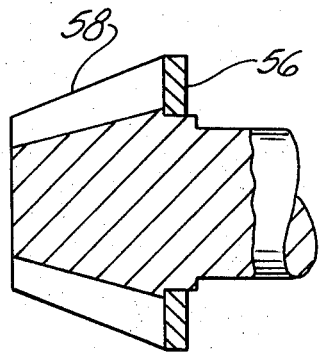
FIG. 9 is a sectional view taken through another bevel gear incorporating the invention.

FIG. 9 illustrates a bevel gear or pinion gear having a reinforcement band or ring 56 welded or brazed to the heel areas of the gear teeth 58. The function of the ring is generally the same as that of the previously described reinforcement rings or bands.

The various illustrated forms of the invention are advantageous in that the gear body can be formed by machining operations, thereby permitting closer control of dimensions and surface smoothness than is permitted with casting operations. Additionally, the reinforcement ring can be formed of a different material than the gear body. The reinforcement ring can be applied to existing gears known to have marginal load safety factor.

Some variations may be practical without departing from the invention as defined in the appended claims.

I claim:

1. In a gear comprising a circular gear body having an endless edge surface bounded by endless side faces; and tooth-forming grooves machined in the edge surface from one side face of the body to the other side face of the body: the improvement comprising an endless separately formed tooth-reinforcement ring having rigid connections with each tooth outwardly of the tooth root surface, whereby loads applied to each tooth are transmitted to the ring and to the other teeth.

2. The gear of claim 1 wherein the reinforcement ring takes the form of a tensioned band encircling the body to exert inwardly radiating compressive forces on the edges of the teeth.

3. The gear of claim 1 wherein the reinforcement ring is strained to exert frictional stress on the gear teeth.

4. The gear of claim 1 wherein the gear is a bevel gear; one of the endless side faces constituting an outer circumferential face of the gear body, and the other endless side face constituting an inner circumferential face of the gear body.

5. The gear of claim 4 wherein the reinforcement ring consists of a band encircling the outer circumferential face of the gear body.

6. The gear of claim 5 wherein the reinforcement band is tensioned to exert inwardly radiating compressive forces on the edges of the teeth.

7. The gear of claim 1 wherein the gear body and ring are formed of dissimilar materials.

8. The gear of claim 7 wherein the gear body is bronze and the ring is steel.

9. The gear of claim 1 wherein the ring takes the form of a plate positioned flatwise against one of the gear body side faces.

10. The gear of claim 1 wherein the ring is connected to each tooth by means of electron beam welding.

* * * * *